(12) United States Patent
Marshall et al.

(10) Patent No.: US 9,664,053 B2
(45) Date of Patent: May 30, 2017

(54) INTEGRAL TEXTILE STRUCTURE FOR 3-D CMC TURBINE AIRFOILS

(71) Applicant: TELEDYNE SCIENTIFIC & IMAGING, LLC, Thousand Oaks, CA (US)

(72) Inventors: David B. Marshall, Thousand Oaks, CA (US); Brian N. Cox, Sherman Oaks, CA (US); Olivier H. Sudre, Thousand Oaks, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 524 days.

(21) Appl. No.: 14/179,289

(22) Filed: Feb. 12, 2014

(65) Prior Publication Data

US 2015/0226071 A1    Aug. 13, 2015

(51) Int. Cl.
| | |
|---|---|
| *F01D 5/28* | (2006.01) |
| *F01D 5/14* | (2006.01) |
| *F01D 5/18* | (2006.01) |
| *B32B 18/00* | (2006.01) |

(52) U.S. Cl.
CPC .............. *F01D 5/282* (2013.01); *B32B 18/00* (2013.01); *F01D 5/147* (2013.01); *F01D 5/187* (2013.01); *F01D 5/284* (2013.01); *C04B 2237/365* (2013.01); *C04B 2237/38* (2013.01); *F05D 2300/6033* (2013.01); *F05D 2300/6034* (2013.01)

(58) Field of Classification Search
CPC .......... F01D 5/282; F01D 5/147; F01D 5/187; F01D 5/284; B32B 18/00; C04B 2237/365; C04B 2237/38; F05D 2300/6033; F05D 2300/6034

USPC .......................................................... 416/230

See application file for complete search history.

(56) References Cited

U.S. PATENT DOCUMENTS

| | | | |
|---|---|---|---|
| 8,263,504 B2 * | 9/2012 | Bouillon ................... | B32B 5/08 139/384 R |
| 8,499,450 B2 * | 8/2013 | Naik ....................... | B29B 11/16 29/419.1 |
| 8,662,855 B2 * | 3/2014 | Naik ....................... | F01D 5/147 29/419.1 |
| 8,685,868 B2 * | 4/2014 | Bouillon ................. | B29C 70/24 139/384 R |

(Continued)

*Primary Examiner* — Jason L Vaughan
(74) *Attorney, Agent, or Firm* — Koppel, Patrick, Heybl & Philpott (57) ABSTRACT

An integral textile structure for 3-D CMC turbine airfoils includes top and bottom walls made from an angle-interlock weave, each of the walls comprising warp and weft fiber tows. The top and bottom walls are merged on a first side parallel to the warp fiber tows into a single wall along a portion of their widths, with the weft fiber tows making up the single wall interlocked through the wall's thickness such that delamination of the wall is inhibited. The single wall suitably forms the trailing edge of an airfoil; the top and bottom walls are preferably joined along a second side opposite the first side and parallel to the radial fiber tows by a continuously curved section in which the weave structure remains continuous with the weave structure in the top and bottom walls, the continuously curved section being the leading edge of the airfoil.

22 Claims, 8 Drawing Sheets

(56) References Cited

U.S. PATENT DOCUMENTS

| | | | |
|---|---|---|---|
| 8,846,147 B2* | 9/2014 | Eberling-Fux | C04B 35/52 |
| | | | 427/249.2 |
| 9,033,673 B2* | 5/2015 | Roussille | F01D 5/147 |
| | | | 416/229 A |
| 9,045,992 B2* | 6/2015 | Roussille | B29C 70/24 |
| 9,062,562 B2* | 6/2015 | Coupe | F01D 25/00 |
| 9,080,454 B2* | 7/2015 | Coupe | B29C 70/222 |
| 2013/0089429 A1* | 4/2013 | Nunez | C04B 35/571 |
| | | | 416/230 |
| 2014/0030076 A1* | 1/2014 | Nunez | F01D 5/282 |
| | | | 415/183 |
| 2014/0072443 A1* | 3/2014 | Mateo | F01D 5/282 |
| | | | 416/241 R |

* cited by examiner

INTEGRAL TEXTILE STRUCTURE FOR 3-D CMC TURBINE AIRFOILS

GOVERNMENT RIGHTS

This invention was made with Government support under US Air Force Contract No. FA8650-07-C-5251 and NASA Contract No. NNC08CA45C. The Government has certain rights in this invention.

BACKGROUND OF THE INVENTION

Field of the Invention

This invention relates generally to ceramic matrix composite (CMC) structures, and more particularly to CMC structures for turbine airfoils.

Description of the Related Art

CMC structures find use in applications that require components capable of withstanding high loads and high temperatures. One such application is the gas turbine, which includes numerous components—including the turbine's vanes or blades (generally, "airfoils")—that are subjected to adverse conditions.

For optimum engine performance, it is generally desirable to have the trailing edges of the turbine airfoils be extremely thin. Previous developments of ceramic composite airfoils for turbine engines have relied mostly on the use of multi-ply 2-D layups of reinforcing fibers. However, such 2-D lay-up structures face several limitations. One is a low through-thickness strength and susceptibility to delamination, especially in the vicinity of a sharp trailing edge and in regions near junctions of the airfoil skin and internal walls.

Another limitation concerns the common requirement for rows of closely spaced cooling holes near the airfoil's leading and trailing edges. The conventional approach of forming the holes by laser drilling after processing of the composite destroys reinforcing fibers, causes damage in the surrounding matrix, and results in severe strength loss in the composite.

Previous attempts to overcome these problems are limited. In the NASA UEET program, a method was developed to provide interlocking of fiber tows that form the sharp trailing edge by use of a Y-fabric, formed by merging two fabrics together during weaving. Although this adds integrity to the tip of the trailing edge, the Y-fabric is only one layer of a 2-D layup and thus does not solve the problem of susceptibility to delamination elsewhere on the airfoil. Moreover, the weaving process used to form the Y-fabric, with warp fibers oriented normal to the trailing edge, is not capable of creating the topology of a closed-wall figure with unbroken interlocked fiber paths around the circumference, as would be required for a continuously reinforced airfoil.

Other textile methods such as braiding and knitting are capable of producing closed airfoil shapes. However, knitting is limited to creating low volume fractions of fibers and would be especially limited with high performance SiC fibers. Braiding is capable of producing high volume fractions of fibers and has the appealing attribute that relatively sharp edges can be formed by passing fiber tows over the edge at a low angle in order to avoid bending the fibers to a small radius of curvature. However, the braiding process is not capable of deploying fibers primarily in two orthogonal directions (radial and circumferential) as needed for optimal design of blades and vanes.

SUMMARY OF THE INVENTION

An integral textile structure for 3-D CMC turbine airfoils is presented which addresses the problems noted above, with a 3-D fiber architecture that reduces or eliminates delamination failures and allows the formation of thin trailing edges.

The present textile structure is a CMC formed from an integral 3-D preform of reinforcing fibers. The structure includes a top wall and a bottom wall made from an angle-interlock weave, each of the walls comprising warp and weft fiber tows. The top and bottom walls are merged on a first side parallel to the warp fiber tows into a single wall along a portion of their widths, with the weft fiber tows making up the single wall interlocked through the wall's thickness such that delamination of the wall is inhibited.

The structure is suitably a turbine airfoil having leading and trailing edges, with the single wall forming the trailing edge of the airfoil and with the warp and weft fiber tows being radial and circumferential fiber tows, respectively. The top and bottom walls are preferably joined along a second side opposite the first side and parallel to the radial fiber tows by a continuously curved section in which the weave structure remains continuous with the weave structure in the top and bottom walls, the continuously curved section being the leading edge of the airfoil.

In one embodiment, the structures top and bottom walls are made from a four-layer, layer-to-layer angle-interlock weave; the warp and weft fiber tows are arranged in columns, with three weaving ends in each warp column and four weft picks in each weft column. When arranged as a turbine airfoil, the structure preferably includes at least one hollow core region between the top and bottom walls, as well as cooling channels formed within the trailing edge which run parallel to the circumferential fiber tows between the hollow core region and the outer edge of the trailing edge.

These and other features, aspects, and advantages of the present invention will become better understood with reference to the following drawings, description, and claims.

BRIEF DESCRIPTION OF THE DRAWINGS

FIGS. 1b, 1c and 1d are cross-sectional views of the airfoil of FIG. 1a.

FIGS. 6b-6k illustrate one possible set of ordering patterns for the weave structure shown in FIG. 6a.

FIG. 9b is a cross-sectional view of a preform made using the weave structure of FIG. 9a.

DETAILED DESCRIPTION OF THE INVENTION

The present textile structure employs a 3-D weaving process capable of creating and combining critical features in fiber preforms required for turbine airfoils. The preforms are reinforced multi-directionally and integrally, preferably with high-performance SiC fibers deployed in favorable positions and orientations to accommodate the centripetal and pressure loads experienced in a turbine blade.

Figure 1A:
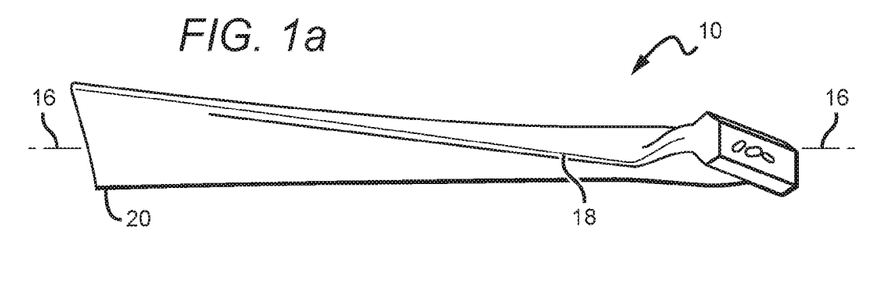
FIG. 1a is a perspective view of an airfoil in accordance with the present invention.
Figures 1B, 1C, 1D:
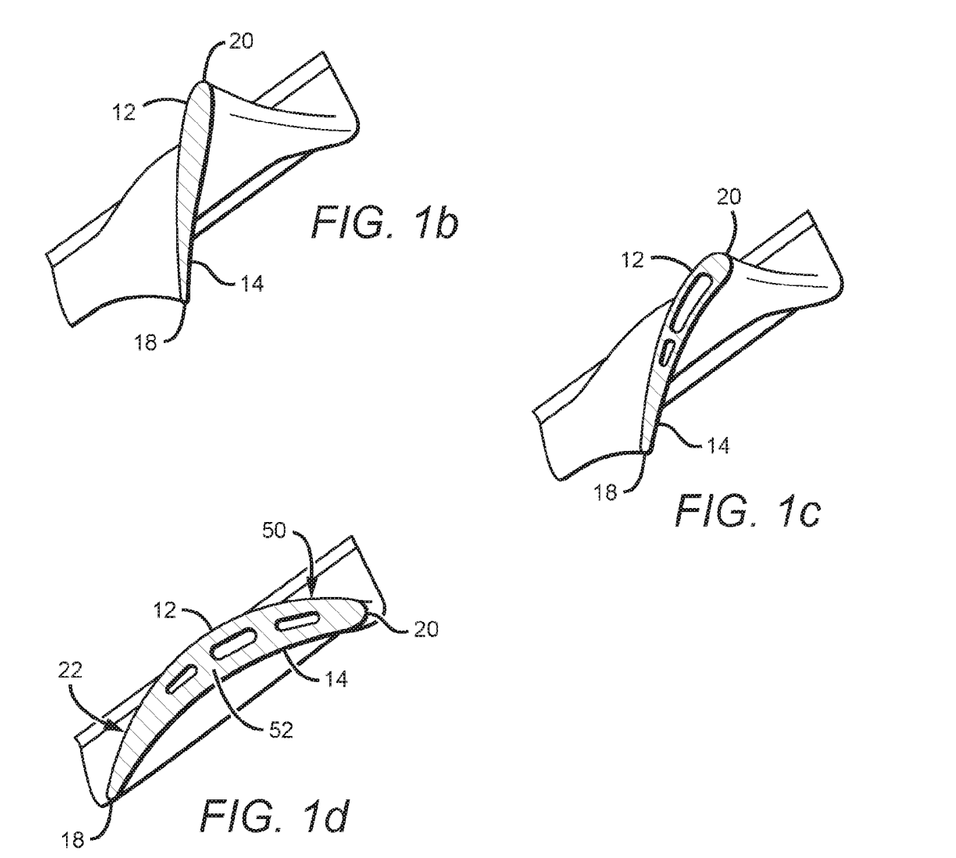

The description below will focus on a turbine airfoil, though it is understood that many different structures could be formed using the techniques described herein. A typical embodiment of an airfoil 10 in accordance with the present structure is shown in FIGS. 1a (perspective view), 1b, 1c and 1d (cross-sections at the tip, midpoint, and base, respectively). The airfoil is formed from an integral 3-D preform of reinforcing fibers, and includes a top wall 12 and a bottom wall 14, each made from an angle-interlock weave and comprising warp and weft fiber tows (not shown). When configured as a turbine airfoil as in FIGS. 1a-1d, the airfoil has an axis 16, a trailing edge 18 and a leading edge 20. The warp and weft fiber tows are radial (i.e., running parallel to the airfoil axis) and circumferential (running perpendicular to the airfoil axis) fiber tows, respectively.

The trailing edge 18 is formed by top and bottom walls 12 and 14, which are merged on a first side 22 parallel to the warp fiber tows into a single wall along a portion of the walls' widths. The weft fiber tows making up the trailing edge are interlocked through the thickness of the edge, such that delamination of the trailing edge is inhibited. The top and bottom walls preferably comprise at least two layers of warp and weft fiber tows, arranged in a multi-layer, layer-to-layer angle-interlock weave—suitably a four-layer, layer-to-layer angle-interlock weave, though different numbers of layers may be desirable for some blades, to provide different thicknesses.

Figure 2:
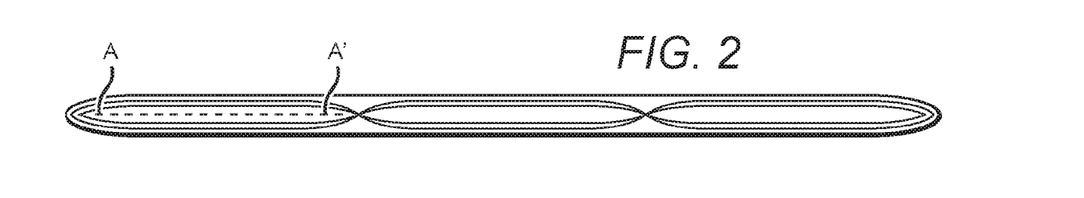
FIG. 2 is a diagram illustrating a design principle for a textile structure in accordance with the present invention.
Figure 3:
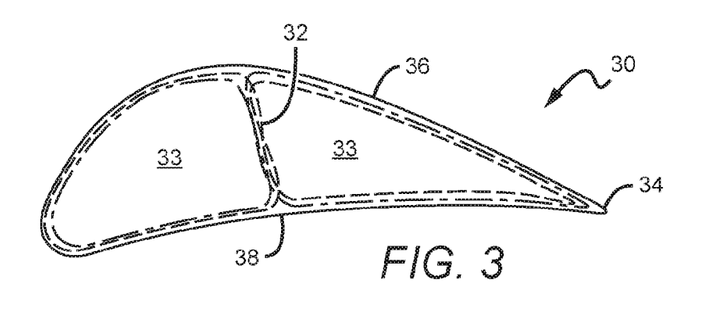
FIG. 3 is a diagram of an airfoil fabricated in accordance with the design principle illustrated in FIG. 2.

A design principle for the present textile structure is illustrated in FIG. 2. The fiber preform is formed by controlling the through-thickness fiber tows (warp or weft weavers) in a multilayer fabric so as not to cross a central plane (A-A' in FIG. 2) in the fabric, while the weft fiber tows follow continuous paths circumscribing the plane, or, as in FIG. 2, paths that alternate above and below multiple planes of separation. Thus the fabric can be opened out after weaving to form a variety of channel structures, including an airfoil 30 with an internal wall 32 which divides the interior of the hollow blade into two channels 33 as illustrated in FIG. 3.

Figure 4:
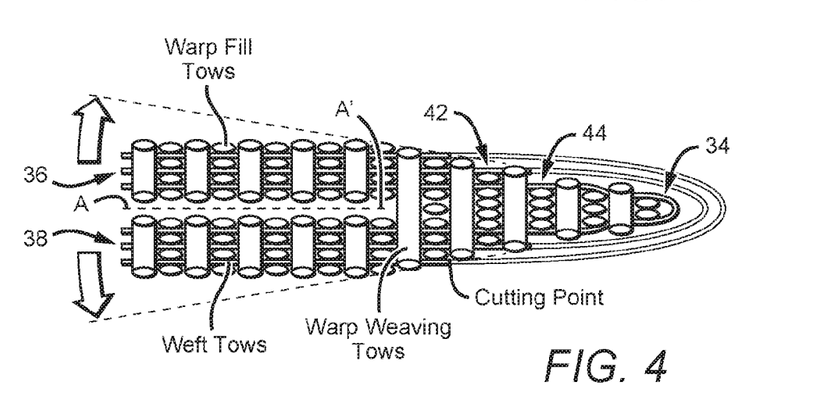
FIG. 4 is a diagram of one possible weave structure in accordance with the present invention.
Figure 5:
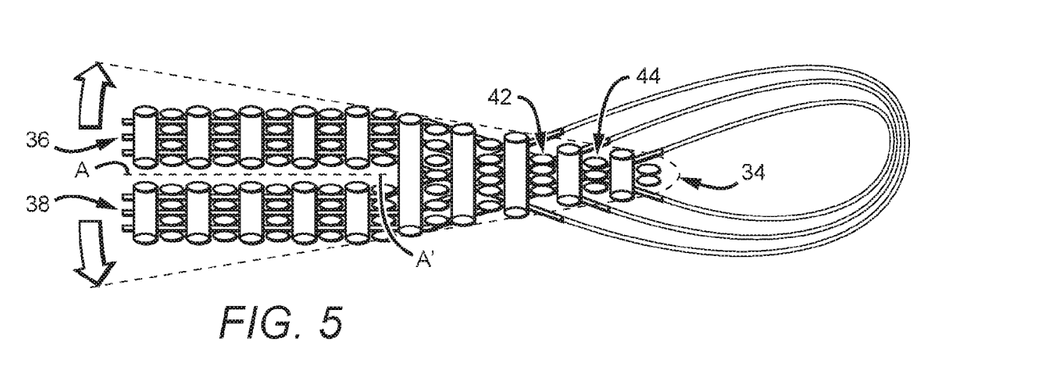
FIG. 5 is a diagram of another possible weave structure in accordance with the present invention.

In forming a sharp, preferably tapered trailing edge 34, where the total thickness must taper to a value smaller than the combined thickness of two merging walls 36, 38, the weave structure can be modified locally, as illustrated in FIGS. 4 and 5, where the warp weaving tows beyond the plane of separation (A-A') form a fully connected 3-D structure. The radial fiber tows preferably include warp fill tows, columns of which preferably make up the trailing edge. The total number of warp fill tows in each column (e.g., 42, 44) decreases as trailing edge 34 is approached (moving left to right in the figure). The warp and weft fiber tows are preferably arranged in columns, with, for example, three weaving ends in each warp column and four weft picks in each weft column.

One limiting characteristic of the architecture shown in FIG. 4 is that the minimum radius of curvature that can be achieved at the trailing edge is limited by the curvature that can be developed where the weft tow labeled 'B' turns. The radius of curvature of the turning tow generally decreases with the tow denier, but cannot be less than the minimum radius of curvature achievable for a single fiber. For a Sylramic SiC fiber, for example, this is approximately 0.5 mm (fiber fracture limit), which therefore poses an undesirable limit on feasible designs. The practical limit during weaving, imposed by elastic stiffness of the fiber tow and constraining forces that can be applied to neighboring tows without causing excessive distortion of the weave pattern, is much higher. In this case, a viable alternative is to leave the weft tows protruding beyond the furthest warp tows in a staggered pattern during weaving, as illustrated for two possible weave patterns in FIGS. 4 and 5, and to cut the protruding tows after weaving. These protruding tows form a brush-like base of reinforcing fibers, which can be pressed down by tooling to form a smoothly tapered tip, whose tip radius of curvature is a small multiple of the individual fiber diameter. The minimum attainable radius of curvature for the edge with this reinforcement variant is likely to be determined not by the fibers but by the limitations of matrix processing and lifetime considerations (erosion or environmental attack).

The weaving approach shown in FIG. 5 is well suited for forming channel structures with a uniform cross-section along their length. However, a turbine airfoil's tapered blade requires a channel structure with a varying cross section width. One way in which this can be accomplished requires keeping the warp spacing constant and modifying the weave pattern continuously during weaving, including dropping warp fibers from the preform, to produce the required taper.

Referring back to FIG. 1d, the leading edge 20 of a turbine airfoil in accordance with the present design has top and bottom walls 12, 14, joined along a second side 50 opposite first side 22 and parallel to the radial fiber tows by a continuously curved section in which the weave structure remains continuous with the weave structure in the top and bottom walls.

A preferred embodiment of the present structure includes at least one hollow core region (52 in FIG. 1d, 33 in FIG. 3) between the top and bottom walls through which cooling air can flow; in some embodiments, the hollow core region is formed solely from the warp and weft fiber tows which make up the top and bottom walls. The structure may further include channels formed within the trailing edge which run parallel to the circumferential fiber tows between the hollow core region and the outer edge of the trailing edge.

Figure 6A:
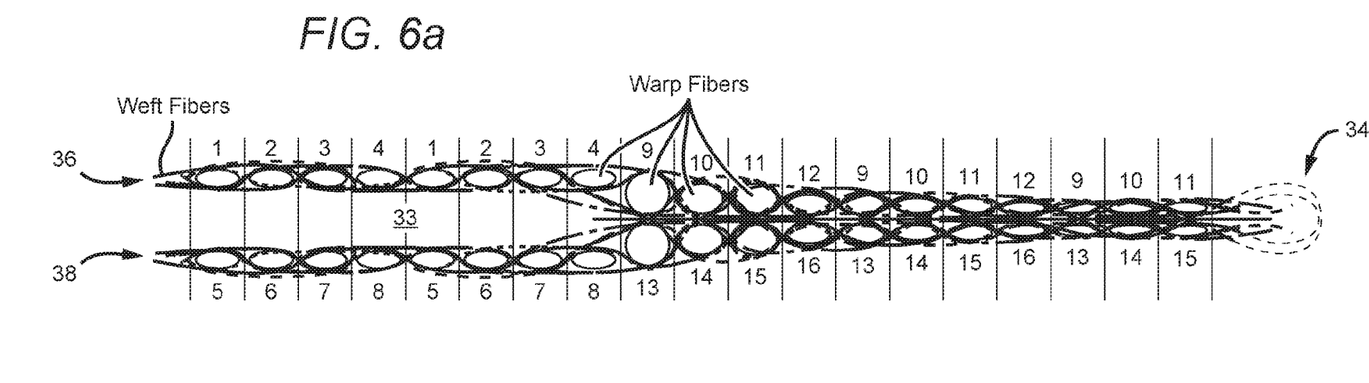
FIG. 6a is a diagram of another possible weave structure in accordance with the present invention.
Figure 6B:
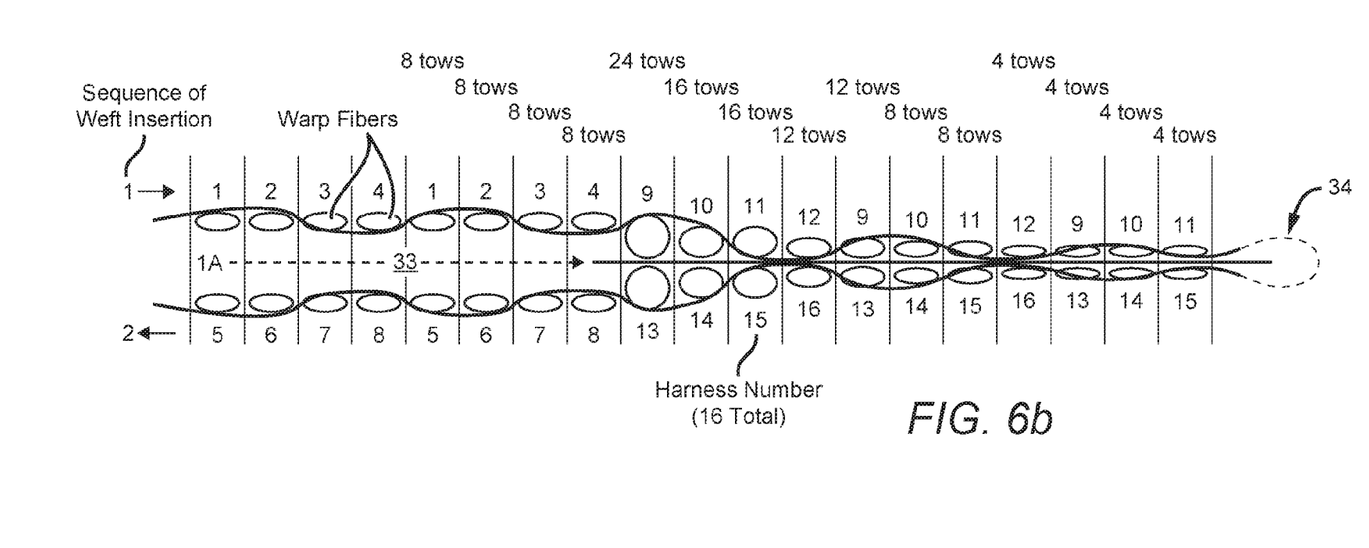

One possible weave structure is detailed in FIG. 6a. Here, the walls of the airfoil around the cavity 33 are produced with a 3-layer through-thickness angle interlock weave architecture, with all of the weft fiber tows following through-thickness paths through the tapered trailing edge region 34. The varying thickness of the trailing edge region is controlled by collecting multiple fiber tows into bundles in each warp position, with the number of tows in each bundle varying with position. This structure has the useful feature that a high volume fraction of radial (warp) fibers can be produced and the fiber tows tend to remain relatively straight in this region. However, this design has the possible disadvantage that the creation of larger thickness walls around the central cavity 33 requires relatively large bundles of tows, resulting in a coarse weave structure with relatively large gaps between tows that could become matrix-rich pockets in the finished blade.

Alternative weave structures allow different wall thickness to be chosen with minor modification to the weaving process, while maintaining a fine scale weave structure with more uniform fiber packing, and having the majority of fibers aligned in the radial direction and with minimal waviness amplitude in the paths of the radial fiber tows. The choice of optimum wall thickness is affected by a trade-off of weight and bending stresses, as well as weaving constraints.

One possible set of ordering patterns for the weave structure detailed in FIG. 6a is shown in FIGS. 6b-6k. The numbers and arrows on the weft tows indicate the order and direction in which they are added to the weave. In FIGS. 6b and 6d-6k, fiber tows (indicated with respective ovals) with the same numbers are in equivalent positions in the periodic weave structure. The weave structure in the top and bottom walls and in some regions of trailing edge region 34 repeats every 4 warp tows. It also repeats in the other direction every 12 weft tows.

Figure 6C:
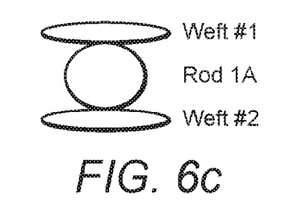
Figure 6D:
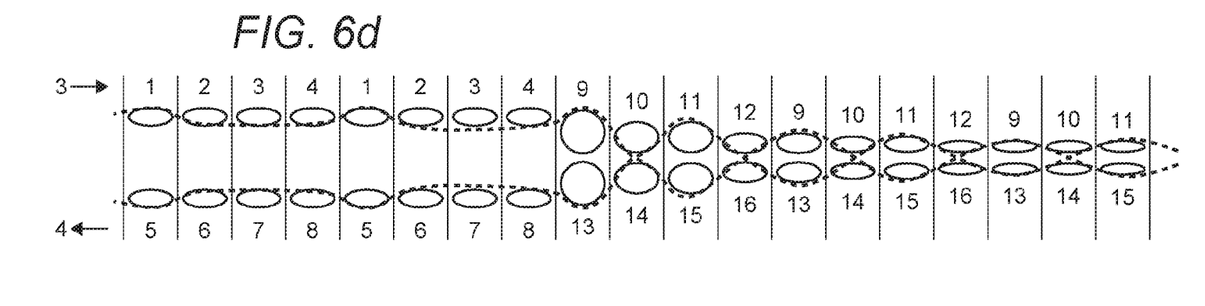
Figure 6E:
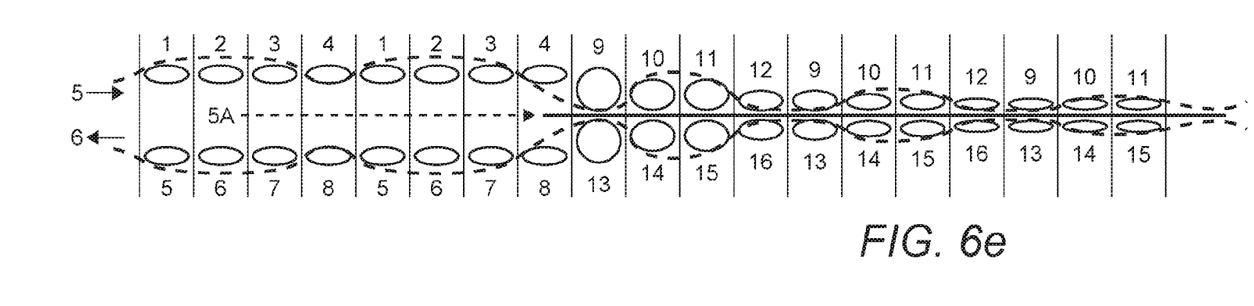
Figure 6F:
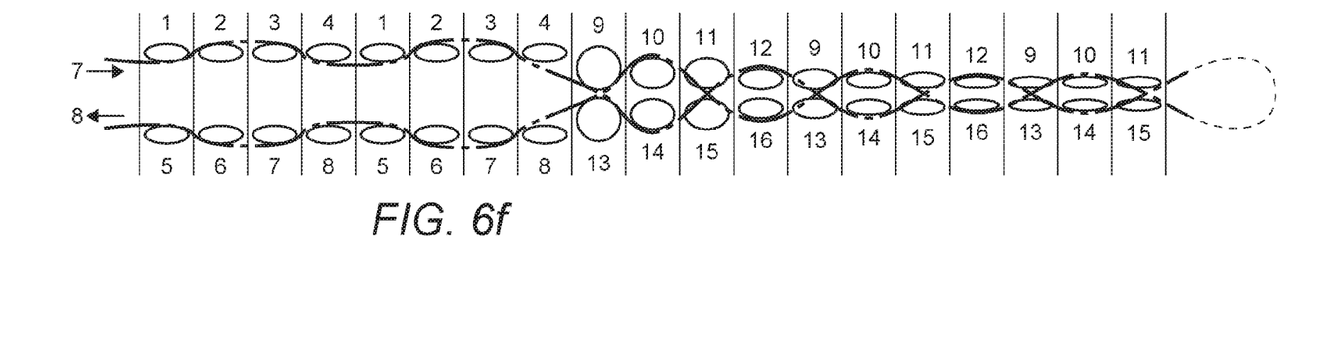
Figure 6G:
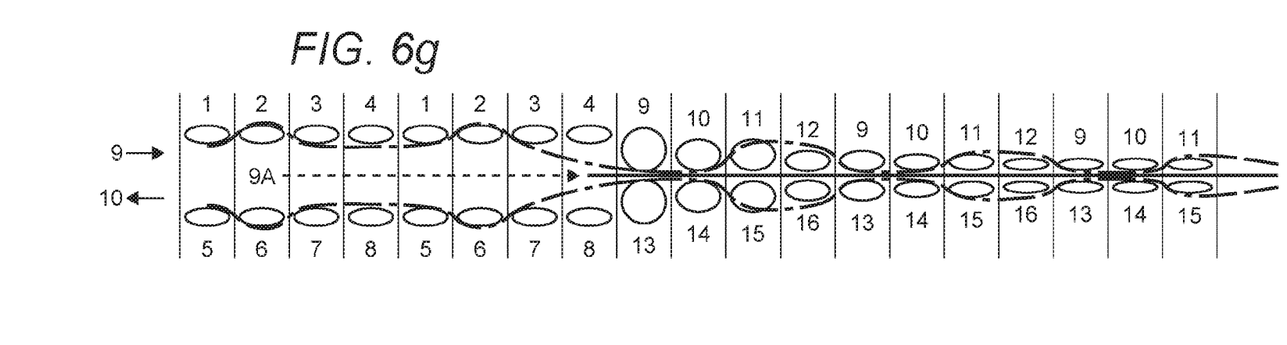
Figure 6H:
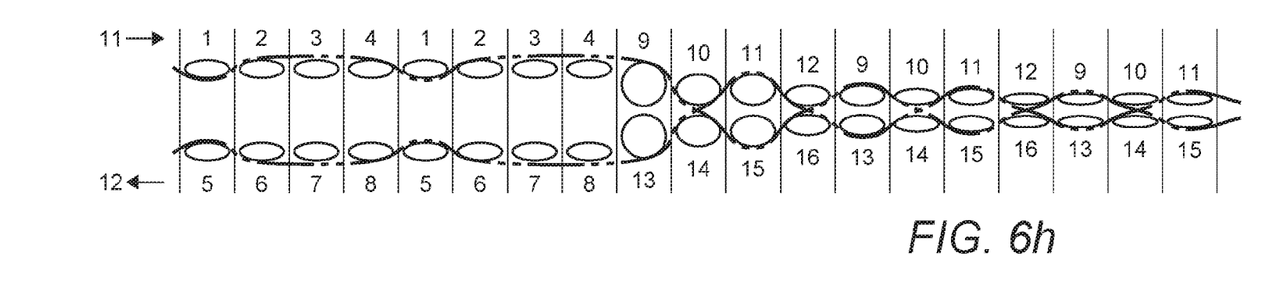
Figure 6I:
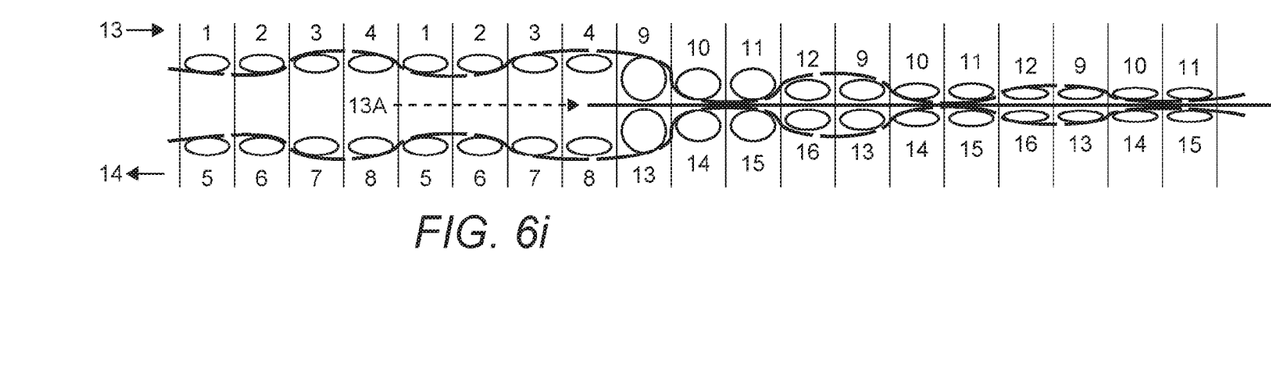
Figure 6J:
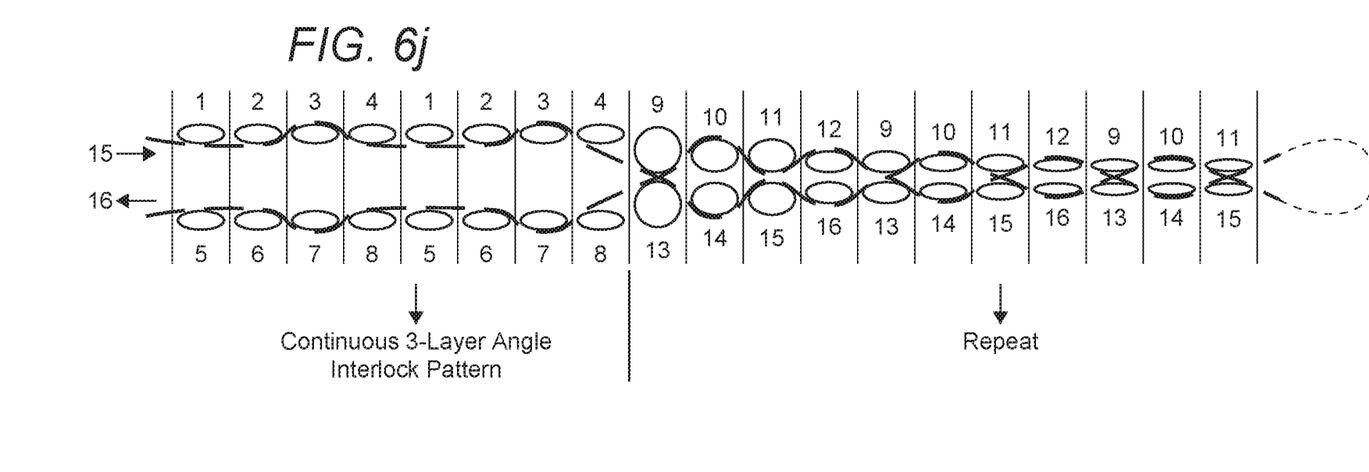
Figure 6K:
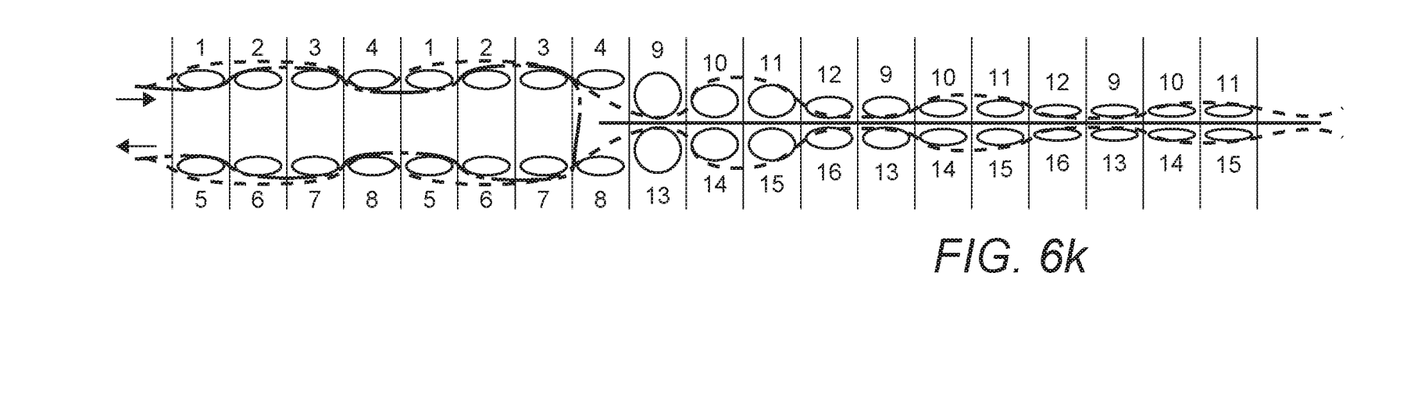

One or more metal rods (1A), suitably molybdenum, may be included in the structure as shown. The rods are etched out after infiltration, thereby creating channels between cavity 33 and the outer edge of trailing edge 34 through which cooling air can be conveyed. A suitable diameter for rod 1A would be 0.5 mm. Weft tows 1 and 2 should stack under and on top of the rod, rather than to its sides, as shown in FIG. 6c.

The fibers are typically produced in tows of about 500 fibers. In the exemplary weave structure shown, multiple tows are gathered together in each warp and weft position. The labels ('4 tows', '8 tows', etc.) shown in FIG. 6b indicate the number of tows in each position.

Figure 7A:
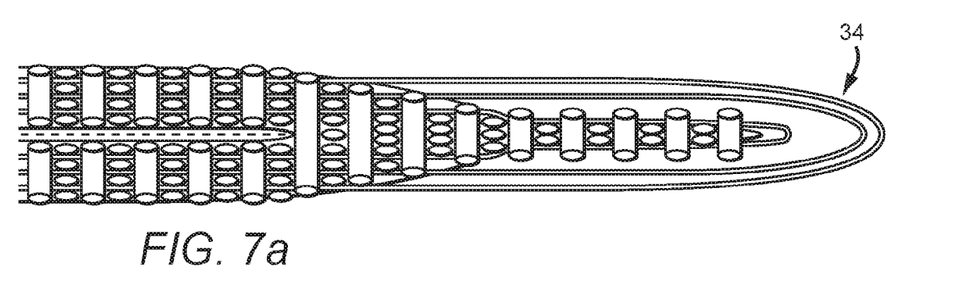
FIG. 7a is a diagram of another possible weave structure in accordance with the present invention.
Figure 7B:
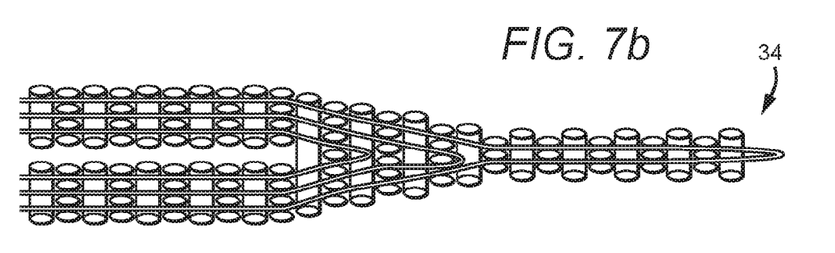
FIG. 7b is a diagram of another possible weave structure in accordance with the present invention.

Other possible weave structures are shown in FIGS. 7a and 7b. In FIG. 7a, a reduced weft fiber count in trailing edge region 34 is produced by drawing weft tows out of the woven preform in a staggered pattern during weaving, and removing them by cutting after weaving. The through-thickness reinforcement in this case is provided by the warp fibers. Though generally providing desirable features, this structure has shortcomings with respect to uniformity where the walls merge into the trailing edge region and disruption of the weave where the weft tows are drawn out of the preform and cut.

Figure 8A:
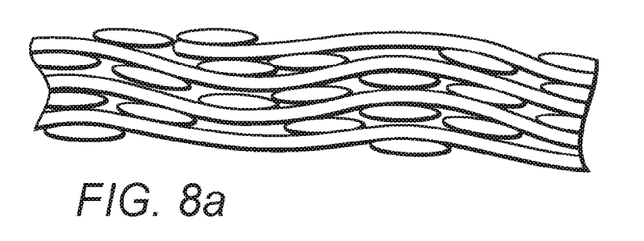
FIGS. 8a and 8b are cross-sectional views of a wall in the hollow core region of the weave structure shown in FIG. 7b.
Figure 8B:
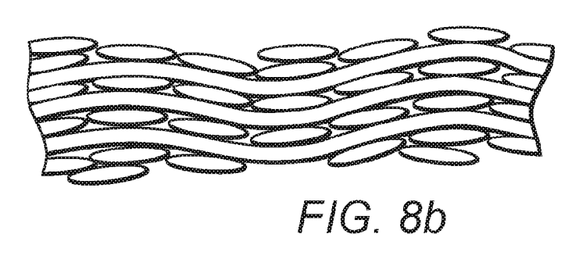

In FIG. 7b, the paths of the weft fiber tows have been modified to make them turn in a staggered pattern within trailing edge region 34, thus avoiding the need for cutting any fiber tows; as such, this weave structure is preferred. FIGS. 8a and 8b are cross-sectional views of a wall in the hollow core region of the FIG. 7b structure, normal to the warp (radial) and weft (circumferential) directions, respectively.

Figure 9A:
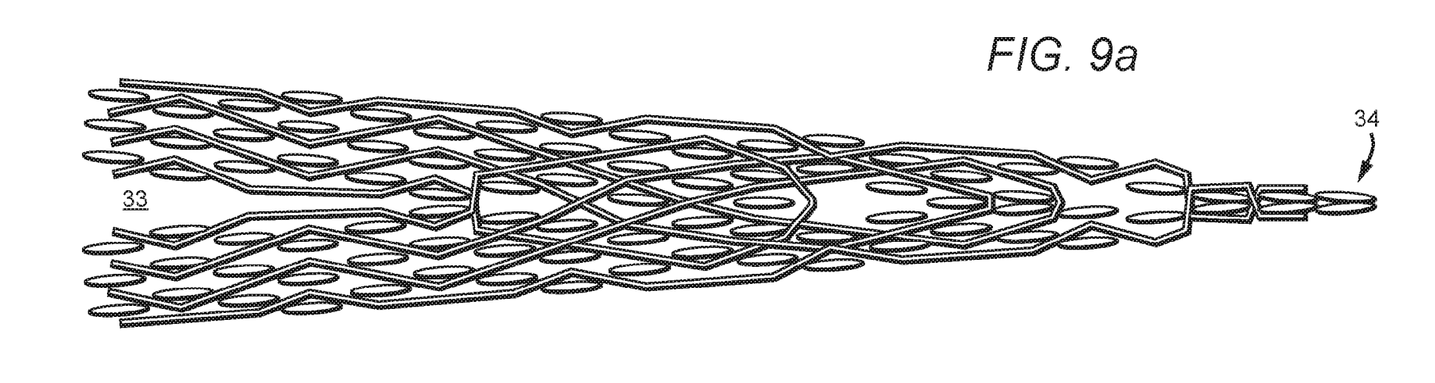
FIG. 9a a diagram of another possible weave structure in accordance with the present invention.
Figure 9B:
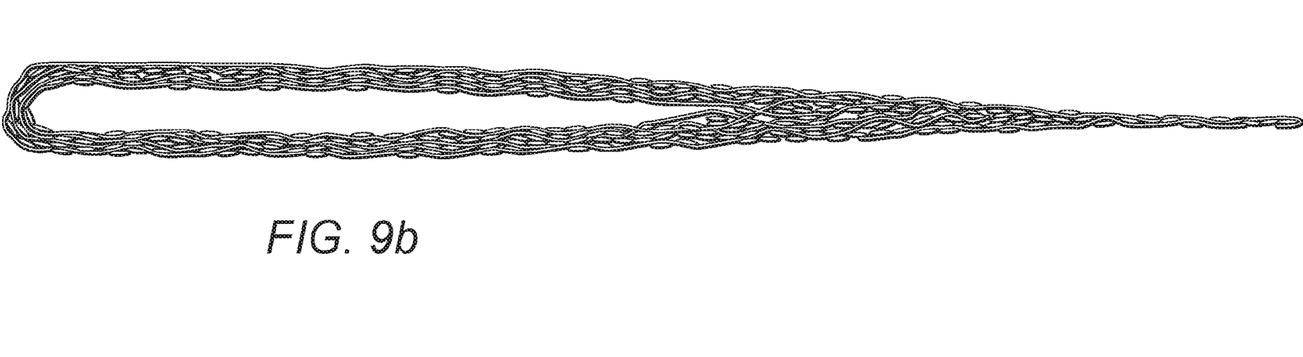

Another possible weave structure is shown in FIGS. 9a and 9b. FIG. 9a is a schematic of the region between the hollow core 33 and the trailing edge 34 of an airfoil, and FIG. 9b is a cross-section of a woven preform which uses the weave structure of FIG. 9a, after being rigidized with epoxy. The path of each weft fiber tow within the wedge region crosses the centerline of the wedge twice, thus providing improved reinforcement against the possibility of splitting driven by coolant pressure inside the hollow core. In the structure shown in FIG. 7b, the weft fibers cross the centerline once where their path turns by 180°; the fiber tows may break at this location, leaving minimal reinforcement across this plane. However, in the FIG. 9a structure, significant reinforcement remains even if the weft fibers break at the turning point. The FIG. 9a structure also enables the formation of a trailing edge that tapers to a thickness of ~1 mm.

The warp and weft fiber tows preferably comprise SiC, and the matrix is also preferably SiC.

The embodiments illustrated herein are merely exemplary, with each being just one possible implementation of the general concept of creating an integral 3-D preform of reinforcing fibers for a high temperature ceramic composite turbine blade, with positioning and alignment of the fibers arranged so that (i) the blade can withstand the various stresses imposed by rotation, combustion gas pressure differences, and internal coolant pressure, and (ii) thin tapered trailing edges containing internal coolant channels can be formed as part of the integral preform without having to machine the surface shapes or drill holes, and without the use of ply lay-up processes (which are susceptible to delamination). This is accomplished by merging the multilayer interlock structure of the walls together to form the tapered trailing edge region, and doing it in a way that the tapered trailing edge region has fiber tows interlocked through its thickness so that there is no weak plane that can delaminate. The weave is preferably a 4-layer, layer-to-layer angle-interlock weave, though other well-known variants of interlock weave structures could also be used.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A ceramic matrix composite (CMC) structure formed from an integral 3-D preform of reinforcing fibers, comprising:
    a top wall made from an angle-interlock weave; and
    a bottom wall made from an angle-interlock weave, each of said walls comprising warp and weft fiber tows;
    said top and bottom walls merged on a first side parallel to the warp fiber tows into a single wall along a portion of their widths, said weft fiber tows making up said single wall interlocked through the thickness of said single wall such that delamination of said single wall is inhibited, said warp and weft fiber tows being radial and circumferential fiber tows, respectively;
    wherein said top and bottom walls are joined along a second side opposite said first side and parallel to the radial fiber tows by a continuously curved section in which the weave structure remains continuous with the weave structure in the top and bottom walls.

2. The structure of claim 1, wherein said top and bottom walls are made from a multi-layer, layer-to-layer angle-interlock weave.

3. The structure of claim 2, wherein said multi-layer, layer-to-layer angle-interlock weave is a four-layer, layer-to-layer angle-interlock weave.

4. The structure of claim 3, wherein said warp and weft fiber tows are arranged in columns, with three weaving ends in each warp column and four weft picks in each weft column.

5. The structure of claim 1, wherein said structure is a turbine airfoil having leading and trailing edges, said single wall forming the trailing edge of said turbine airfoil.

6. The structure of claim 1, wherein each of said top and bottom walls comprise at least two layers of said warp fiber tows and said single wall comprises at least four layers of said warp fiber tows.

7. The structure of claim 1, wherein said warp and weft fiber tows comprise SiC.

8. The structure of claim 7, further comprising a SiC matrix.

9. The structure of claim 1, further comprising one or more metal rods that extend through the middle of said single wall parallel to said circumferential fiber tows making up said single wall.

10. The structure of claim 5, further comprising at least one hollow core region between said top and bottom walls.

11. The structure of claim 10, further comprising channels formed within said trailing edge which run parallel to the circumferential fiber tows between said hollow core region and the outer edge of said trailing edge.

12. The structure of claim 5, wherein said trailing edge is tapered.

13. The structure of claim 12, wherein said radial fiber tows include warp fill tows, said trailing edge comprising columns of said warp fill tows, said trailing edge taper effected by varying the number of warp fill tows in said columns.

14. The structure of claim 5, wherein said structure is arranged such that said trailing edge is formed without cutting said circumferential fiber tows.

15. A ceramic matrix composite (CMC) structure formed from an integral 3-D preform of reinforcing fibers, comprising:
    a top wall made from an angle-interlock weave; and
    a bottom wall made from an angle-interlock weave, each of said walls comprising warp and weft fiber tows;
    said top and bottom walls merged on a first side parallel to the warp fiber tows into a single wall along a portion of their widths, said weft fiber tows making up said single wall interlocked through the thickness of said single wall such that delamination of said single wall is inhibited;
    wherein said structure is a turbine airfoil having leading and trailing edges, said single wall forming the trailing edge of said turbine airfoil, said warp and weft fiber tows being radial and circumferential fiber tows, respectively; and
    wherein said top and bottom walls are joined along a second side opposite said first side and parallel to the radial fiber tows by a continuously curved section in which the weave structure remains continuous with the weave structure in the top and bottom walls, said continuously curved section being the leading edge of said turbine airfoil.

16. A ceramic matrix composite (CMC) structure formed from an integral 3-D preform of reinforcing fibers, comprising:
    a top wall made from an angle-interlock weave; and
    a bottom wall made from an angle-interlock weave, each of said walls comprising warp and weft fiber tows;
    said top and bottom walls merged on a first side parallel to the warp fiber tows into a single wall along a portion of their widths, said weft fiber tows making up said single wall interlocked through the thickness of said single wall such that delamination of said single wall is inhibited;
    wherein said structure is a turbine airfoil having leading and trailing edges, said single wall forming the trailing edge of said turbine airfoil, said warp and weft fiber tows being radial and circumferential fiber tows, respectively;
    wherein said structure is arranged such that said trailing edge is formed without cutting said circumferential fiber tows; and
    wherein said circumferential fiber tows form continuous closed paths in the circumferential direction.

17. A ceramic matrix composite (CMC) turbine airfoil formed from an integral 3-D preform of reinforced fibers, said airfoil having an associated airfoil axis and a circumferential direction which is perpendicular to said airfoil axis, comprising:
    a top wall made from a multi-layer, layer-to-layer angle-interlock weave; and
    a bottom wall made from a multi-layer, layer-to-layer angle-interlock weave, said top and bottom walls located above and below at least one hollow core region, each of said walls comprising radial (warp) fiber tows that run parallel to the axis of the airfoil and circumferential (weft) fiber tows that form continuous closed paths in the circumferential direction;
    said top and bottom walls merged on a first side into a single wall along a portion of their widths to form the trailing edge of said airfoil, said circumferential fiber tows making up said trailing edge interlocked through the thickness of said trailing edge such that delamination of said trailing edge is inhibited.

18. The structure of claim 17, wherein said multi-layer, layer-to-layer angle-interlock weave is a four-layer, layer-to-layer angle-interlock weave, wherein said warp and weft fiber tows are arranged in columns, with three weaving ends in each warp column and four weft picks in each weft column.

19. The structure of claim 17, wherein said trailing edge is tapered.

20. The structure of claim 19, wherein said radial fiber tows comprise warp tows including warp fill tows, and said circumferential fiber tows comprise weft tows, said trailing edge comprising columns of said warp fill tows, said trailing edge taper effected by varying the number of warp fill tows in said columns.

21. The structure of claim 17, wherein said top and bottom walls are joined along a second side opposite said first side and parallel to the radial (warp) fiber tows so as to form a continuously curved section in which the weave structure remains continuous, said continuously curved section being the leading edge of said turbine airfoil.

22. A ceramic matrix composite (CMC) structure formed from an integral 3-D preform of reinforcing fibers, comprising:
    a top wall made from an angle-interlock weave;
    a bottom wall made from an angle-interlock weave, each of said walls comprising warp and weft fiber tows;
    at least one hollow core region between said top and bottom walls, said at least one hollow core region formed solely from said warp and weft fiber tows;
    said top and bottom walls merged on a first side parallel to the warp fiber tows into a single wall along a portion of their widths, said weft fiber tows making up said single wall interlocked through the thickness of said single wall such that delamination of said single wall is inhibited, said warp and weft fiber tows being radial and circumferential fiber tows, respectively;
    wherein said top and bottom walls are joined along a second side opposite said first side and parallel to the radial fiber tows by a continuously curved section in which the weave structure remains continuous with the weave structure in the top and bottom walls.

* * * * *